US012790498B2

(12) United States Patent
Chikosha et al.

(10) Patent No.: US 12,790,498 B2
(45) Date of Patent: Nov. 10, 2026

(54) CORROSION PROTECTION FOR METALLIC SUBSTRATES

(71) Applicant: APPLIED GRAPHENE MATERIALS UK LIMITED, Redcar (GB)

(72) Inventors: Lynn Chikosha, Redcar (GB); Matthew David Sharp, Redcar (GB); Samuel Edward Whitehead, Redcar (GB); William Weaver, Redcar (GB)

(73) Assignee: Universal Matter Inc., Burlington (CA)

( * ) Notice: Subject to any disclaimer, the term of this patent is extended or adjusted under 35 U.S.C. 154(b) by 852 days.

(21) Appl. No.: 17/430,167

(22) PCT Filed: Feb. 6, 2020

(86) PCT No.: PCT/GB2020/050273
§ 371 (c)(1),
(2) Date: Aug. 11, 2021

(87) PCT Pub. No.: WO2020/165556
PCT Pub. Date: Aug. 20, 2020

(65) Prior Publication Data

US 2022/0119649 A1 Apr. 21, 2022

(30) Foreign Application Priority Data

Feb. 11, 2019 (GB) ..................................... 1901895
Feb. 13, 2019 (GB) ..................................... 1901956

(51) Int. Cl.
*C09D 5/10* (2006.01)
*B05D 7/00* (2006.01)
(Continued)

(52) U.S. Cl.
CPC ............. *C09D 5/106* (2013.01); *B05D 7/574* (2013.01); *C09D 5/084* (2013.01);
(Continued)

(58) Field of Classification Search
CPC .......... C09D 5/106; C09D 5/084; C09D 7/61; C09D 5/002; C09D 163/00; C09D 175/04;
(Continued)

(56) References Cited

U.S. PATENT DOCUMENTS

2009/0269616 A1* 10/2009 Kendig ................ C23F 11/187 106/14.44
2012/0025142 A1* 2/2012 Visser ...................... C09D 5/10 252/389.61
(Continued)

FOREIGN PATENT DOCUMENTS

CN 105008466 10/2015
CN 106381013 A 2/2017
(Continued)

OTHER PUBLICATIONS

Zhang, WO-2018153361-MT (Year: 2018).*
(Continued)

*Primary Examiner* — Robert S Jones, Jr.
*Assistant Examiner* — Zhen Liu
(74) *Attorney, Agent, or Firm* — Own Innovation Inc.; James W. Hinton; Osman Ismaili

(57) ABSTRACT

A tiecoat coating composition for use in a coating system for a metallic substrate comprising at least three coating layers is disclosed. The system has a primer coating layer which overlies the metallic substrate, a tiecoat coating layer which overlies the primer coating layer, and a finish coating layer which overlies the tiecoat coating layer. The primer coating layer is formed from a primer composition, the tiecoat
(Continued)

coating layer is formed from a tiecoat composition, and the finish coating layer is formed from a finish composition. The primer composition comprises a primer carrier medium and a primer corrosion inhibitor in which the primer inhibitor has a galvanic cathodic mechanism. The finish composition is formulated to give a predetermined surface texture and appearance. The tiecoat composition comprises a tiecoat carrier medium and a tiecoat corrosion inhibitor. The tiecoat corrosion inhibitor has a barrier mechanism.

18 Claims, 3 Drawing Sheets

(51) Int. Cl.

*B82Y 30/00* (2011.01)
*B82Y 40/00* (2011.01)
*C09D 5/08* (2006.01)

(52) U.S. Cl.

CPC ...... *B05D 2202/10* (2013.01); *B05D 2504/00* (2013.01); *B05D 2601/28* (2013.01); *B82Y 30/00* (2013.01); *B82Y 40/00* (2013.01)

(58) Field of Classification Search

CPC .. C09D 201/00; B05D 7/574; B05D 2202/10; B05D 2504/00; B05D 2601/28; B05D 7/14; B05D 7/582; B05D 7/584; B05D 2202/00; B05D 2503/00; B05D 2601/20; B82Y 30/00; B82Y 40/00; C08K 3/042; C08K 2003/0893

See application file for complete search history.

(56) References Cited

U.S. PATENT DOCUMENTS

| | | | | |
|---|---|---|---|---|
| 2015/0247041 | A1* | 9/2015 | Papakonstantinou | C23C 16/26<br>428/408 |
| 2016/0024310 | A1* | 1/2016 | McMullin | C09D 7/62<br>523/400 |
| 2016/0160056 | A1* | 6/2016 | Berteloot | C09D 5/084<br>252/389.2 |
| 2017/0037257 | A1* | 2/2017 | Yang | C09D 5/1618 |
| 2019/0345345 | A1* | 11/2019 | Meng | C09D 149/00 |

FOREIGN PATENT DOCUMENTS

| | | | | |
|---|---|---|---|---|
| CN | 107987683 | A | 5/2018 | |
| CN | 108690465 | A | 10/2018 | |
| EP | 2886616 | A1 | 6/2015 | |
| WO | WO2017070883 | | 5/2017 | |
| WO | WO-2018153361 | A1 * | 8/2018 | C08K 13/02 |

OTHER PUBLICATIONS

Chinese Office Action mailed Jun. 24, 2022 for Chinese Patent Application 2020800277126 a foreign equivalent of U.S. Appl. No. 17/430,167 "Corrosion Protection for Metallic Substrates" Chikosha,L. 11 pages.

* cited by examiner

CORROSION PROTECTION FOR METALLIC SUBSTRATES

This application is a US national stage entry of International Patent Application No. PCT/GB2020/050273, filed Feb. 6, 2020, which claims priority to GB1901956.1, filed Feb. 13, 2019, and to GB1901895.1, filed Feb. 11, 2019, the entire contents of each of which are incorporated by reference herein.

TECHNOLOGICAL FIELD

This invention relates to corrosion protection for metallic substrates. In particular, this application relates to corrosion protection for metallic substrates

BACKGROUND

Corrosion of metal has been estimated to cost about 3% of global Gross Domestic Product (GDP) and constitutes a significant aspect of the global economy. There is substantial interest in the development of new and improved anticorrosive technology, and in particular anticorrosive coatings. Anticorrosive coatings are generally classified in accordance with the mechanisms by which they operate. mechanisms commonly used are barrier protection, inhibition or passivation of the substrate and galvanic cathodic protection.

Coatings employing the barrier mechanism, so called barrier coatings, may be used are often used on structures immersed in water or in the ground. Barrier coatings are typified by the use of inert pigmentation such as micaceous iron oxide, glass flake and lamellar aluminium. These systems are typically used as high pigment volume concentration (PVC) systems and give dense coatings with significantly reduced permeability to water and other aggressive species. The level of protection is highly dependent on the thickness of the coating, number of coats and have been reported to provide the highest performance when the thickness of the coating is built up from several thin coats.

The most common pigment used in barrier coatings is micaceous iron oxide. The optimum performance is obtained with a PVC in the range of 0.5% to 1.5%. When lamellar aluminium is used as the pigment, it is typically the leafing grade. Aluminium based paints or coatings need to be applied as a first coat to impact on cathodic disbonding. Aluminium may also corrode at high and low pH and may therefore corrode by reaction with hydroxyl groups formed at the cathode of any electro chemical cell formed at the metallic substrate/coating interface. Use of glass flake is typically restricted to very thick coatings due to the large size of the flake (100 μm to 1000 μm).

Coatings employing the inhibitive or passivation mechanism, so called Inhibitive coatings, are primarily applied as primers because they function by the reaction of constituents/pigments of the coating with the metallic substrate. These coatings are used preferentially where the substrate is exposed to atmospheric corrosion and not where immersed in water or soil. The inhibitive mechanism relies on passivation of the metal and the build-up of a layer of metallic complexes as a result of the passivation reaction. The metallic complexes impede the transport of aggressive species such as Cl or $H^+$ ions or dissolved oxygen to the metal of the substrate.

The active constituents/pigments of inhibitive coatings are typically marginally water soluble and produce cations on solution. Phosphates are commonly used but chromates, molybdates, nitrates, borates and silicates are also used. The selection of active components is increasingly subject to regulatory pressures due to increased concerns for the environment and health and safety.

Current regulations restrict the materials which can be used in inhibitory coatings. Chrome(VI) compounds have been subject to authorisation under REACH (2008 Annex XIV). Other legislative measures relating to anticorrosive pigments include the ELV (End of Life vehicle) directive which has seen the phase out of lead pigments from 2003 and Chrome(VI) in primers and pre-treatments from 2007. Other regulations include WEEE (Waste Electrical and Electronic Equipment Directive 2006) and RoHS (Restriction of Hazardous Substances Directive 2002) directives which restricted use of Cr(VI) in white goods. In the US OSHA (Occupational Safety and health Administration regulation 2006) reduced employee permissible exposure to Cr(VI) 52 $\mu g/m^3$ to 5 $\mu g/m^3$. Zinc phosphate is also coming under increasing concern given that it is toxic to aquatic organisms and may cause long-term adverse effects in the aquatic environment. Accidental ingestion of the material may be damaging to the health of the individual. Soluble zinc salts produce irritation and corrosion of the alimentary tract with pain, and vomiting. It is thus beneficial to reduce or eliminate such materials from anti corrosive coatings.

The mechanism of inhibitive pigments is based on the partial dissolution of the pigment by water diffused into the coating. At the surface of the metallic substrate the dissolved ions react with the metal and form a reaction product that passivates the surface. It is critical that the inhibitive pigment is sufficiently soluble to release ions for reaction. Too high a solubility can, however, result in blistering at the metal substrate/coating interface. An ideal inhibitive coating should form a barrier against water and detrimental ions while simultaneously releasing a sufficient quantity of inhibitor ions. These two requirements are antagonistic in principle and the inhibitive coating requires a balance between the barrier properties of the coating (the lower the permeability the better the barrier properties) and in the ability of pigment to solvate and the ions created to transfer to the coating substrate interface (the higher the permeability the greater the solvation and transfer of ions). The pigments used in inhibitive coatings may be classified according to their effect on the anodic and cathodic reactions of electrochemical cells formed at the metallic substrate/coating interface.

Galvanic cathodic inhibitors (typically using high levels of zinc (often referred to as “zinc rich”) or inorganic salts of magnesium and manganese) suppress corrosion at the cathode by reaction with hydroxyl ions to form insoluble deposits its increasing the cathodic resistance against polarisation. Anode inhibitors similarly reduce the rate of corrosion by increasing the anodic polarisation at the anode.

BRIEF SUMMARY

According to the present invention there is provided a tiecoat coating composition for use in a coating system for a metallic substrate comprising at least three coating layers in which a primer coating layer overlies the metallic substrate, a tiecoat coating layer overlies the primer coating layer, and a finish coating layer overlies the tiecoat coating layer, the primer coating layer is formed from a primer composition, the tiecoat coating layer is formed from a tiecoat composition, and the finish coating layer is formed from a finish composition, the primer composition comprises a primer carrier medium and a primer corrosion inhibitor, the primer corrosion inhibitor having a galvanic cathodic mechanism, and the finish composition is formulated to give a predetermined surface texture and/or appearance, wherein the tiecoat composition comprises a tiecoat carrier medium and a tiecoat corrosion inhibitor, and the tiecoat corrosion inhibitor has a barrier mechanism.

According to the present invention there is also provided a coating system for a metallic substrate comprising at least three coating layers in which a primer coating layer overlies the metallic substrate, a tiecoat coating layer overlies the primer coating layer, and a finish coating layer overlies the tiecoat coating layer, wherein the primer coating layer is formed from a primer composition, the tiecoat coating layer is formed from a tiecoat composition according to the above paragraph, and the finish coating layer is formed from a finish composition, wherein the primer composition comprises a primer carrier medium and a primer corrosion inhibitor, the primer corrosion inhibitor having a galvanic cathodic mechanism, and the finish composition is formulated to give a predetermined surface texture and/or appearance.

BRIEF DESCRIPTION

For a better understanding of various examples that are useful for understanding the detailed description, reference will now be made by way of example only to the accompanying drawings in which.

Figure 4A:
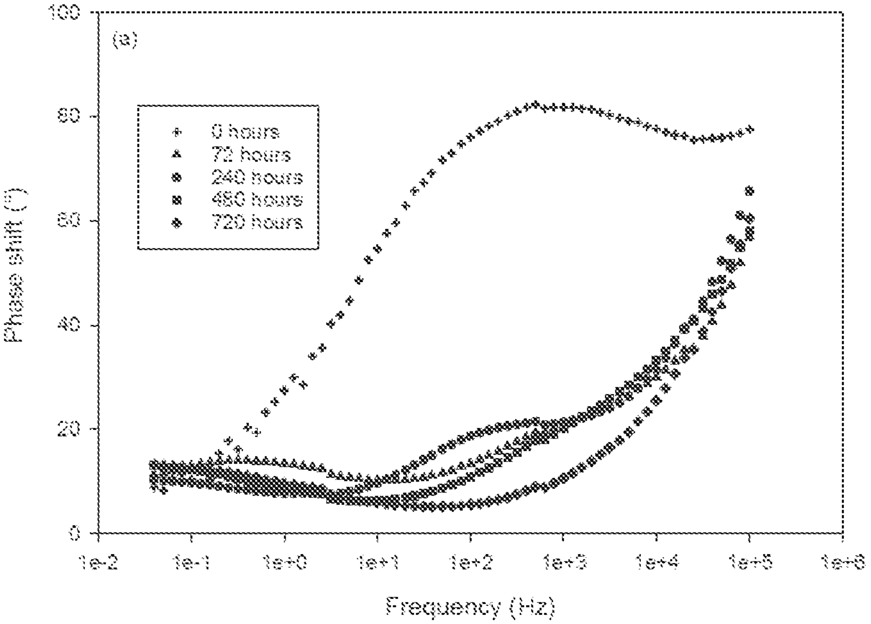
Figure 4B:
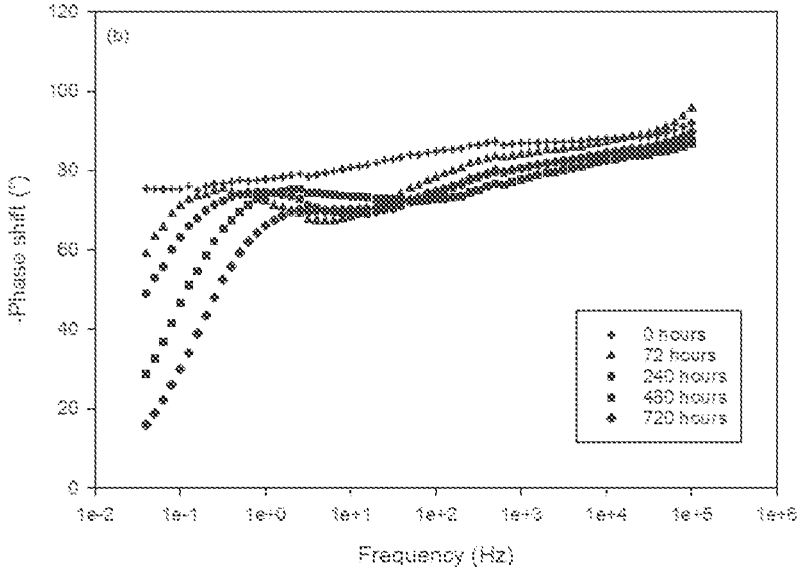

FIG. 4*a* illustrates a selection of phase shift bode plots for a three coat control sample; and FIG. 4*b* illustrates a phase angle bode plot for a higher impedance sample.

DETAILED DESCRIPTION

Examples of the disclosure provide a tiecoat coating composition for use in a coating system for a metallic substrate. The coating system comprises at least three coating layers, in which a primer coating layer (i.e. a first primer coating layer) overlies the metallic substrate, a tiecoat coating layer (i.e. a second tiecoat coating layer) overlies the primer coating layer, and a finish coating layer (i.e. a third finish coating layer) overlies the tiecoat coating layer.

The primer coating layer is formed from a primer composition (i.e. a first primer composition). The tiecoat coating layer is formed from a tiecoat composition (i.e. a second tiecoat composition). The finish coating layer is formed from a finish composition (i.e. a third finish composition). The primer composition comprises a primer carrier medium (i.e. a first primer carrier medium) and a primer corrosion inhibitor (i.e. a first primer corrosion inhibitor). The primer corrosion inhibitor has a galvanic cathodic mechanism. The finish composition is formulated to give a predetermined surface texture and/or appearance. The tiecoat composition comprises a tiecoat carrier medium (i.e. a second tiecoat carrier medium) and a tiecoat corrosion inhibitor (i.e. a second tiecoat corrosion inhibitor). The tiecoat corrosion inhibitor has a barrier mechanism.

The tiecoat corrosion inhibitor creates a barrier which reduces access of water and corrosive ions such as $Cl^-$ or $H^+$ to the metallic substrate. The level of protection is dependent on the integrity of the tiecoat coating, its hydrophobicity, affinity for water and thickness of coating.

In some embodiments of the present invention the tiecoat corrosion inhibitor is present in the range of 0.05 wt % to 1.0 wt %, 0.05 wt % to 0.8 wt %, 0.05 wt % to 0.6 wt %, or 0.1 wt % to 0.5 wt % of the tiecoat composition. In some embodiments of the present invention the tiecoat corrosion inhibitor is present at a rate of 0.1 wt % or 0.5 wt % of the tiecoat composition.

In some embodiments of the present invention, the tiecoat corrosion inhibitor comprises one of or a mixture of graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphitic nanoplates of 6 to 14 layers of carbon atoms, graphite flakes with at least one nanoscale dimension and 40 or less layers of carbon atoms, graphite flakes with at least one nanoscale dimension and 25 to 30 layers of carbon atoms, graphite flakes with at least one nanoscale dimension and 20 to 35 layers of carbon atoms, or graphite flakes with at least one nanoscale dimension and 20 to 40 layers of carbon atoms.

The graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphitic nanoplates of 6 to 14 layers of carbon atoms, graphite flakes with nanoscale dimensions and 40 or less layers of carbon atoms, graphite flakes with nanoscale dimensions and 25 to 30 layers of carbon atoms, graphite flakes with nanoscale dimensions and 20 to 35 layers of carbon atoms, or graphite flakes with nanoscale dimensions and 20 to 40 layers of carbon atoms are hereafter collectively referred to as "graphene/graphitic platelets". Graphene, graphene oxide, and/or reduced graphene oxide nanoplates typically have a thickness of 1 to 10 layers of carbon atoms, typically between 0.3 nm and 3 nm, and lateral dimensions ranging from around 100 nm to 100 μm.

In some embodiments of the present invention, the tiecoat corrosion inhibitor comprises nanoplates of one of or a mixture of 2D materials and or layered 2D materials.

2D materials (sometimes referred to as single layer materials) are crystalline materials consisting of a single layer of atoms. Layered 2D materials consist of layers of 2D materials weakly stacked or bound to form three dimensional structures. Nanoplates of 2D materials and layered 2D materials have thicknesses within the nanoscale or smaller and their other two dimensions are generally at scales larger than the nanoscale.

2D materials used in the composition of the present invention may be graphene, graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D in-plane heterostructure of two or more of the aforesaid materials.

Layered 2D materials may be layers of graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D vertical heterostructure of two or more of the aforesaid materials.

Figure 1:
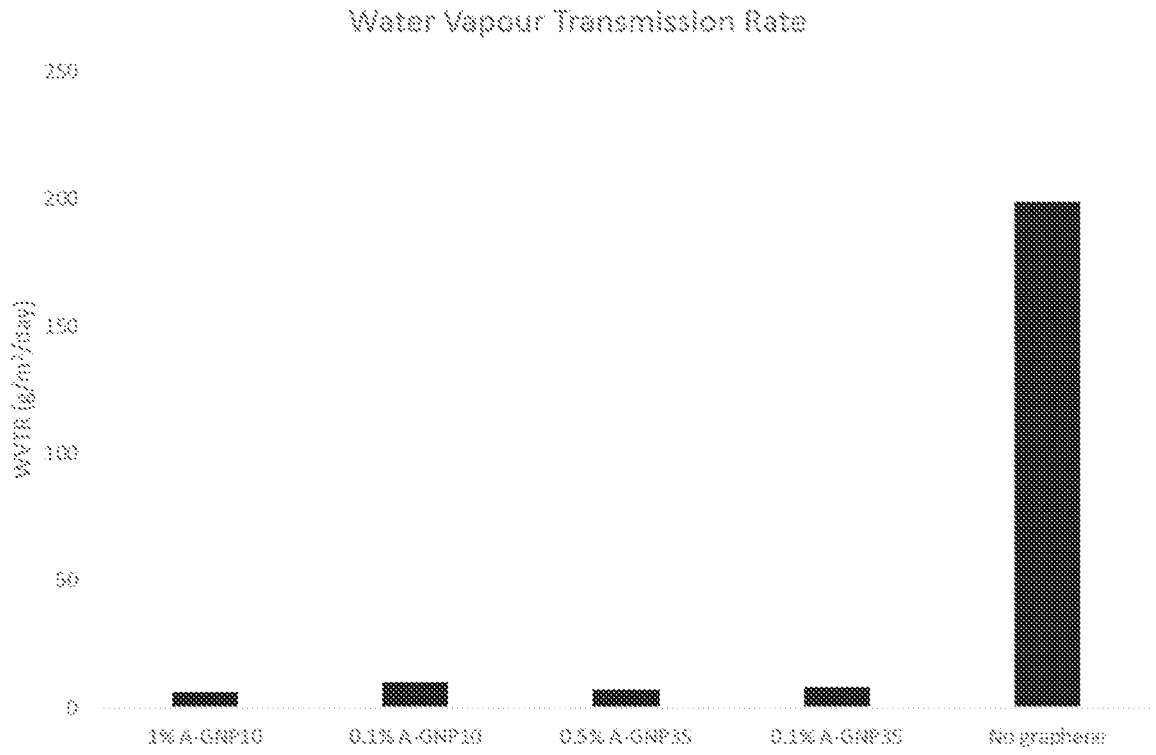
FIG. 1 illustrates results of a test of water vapour transmission rate.

The use of graphene/graphitic platelets and or nanoplates of 2D materials as the tiecoat corrosion inhibitor in tiecoat compositions according to the present invention will, depending on concentration of incorporation of the graphene/graphitic platelets and or nanoplates of 2D materials and applied dry film thickness, result in multiple layers of graphene/graphitic platelets and or nanoplates of 2D materials in the tiecoat layer. Each platelet or nanoplate is potentially several atomic layers thick. The presence of multiple layers of graphene platelets in the tiecoat layer provides a complex and tortuous (labyrinthine) path for the penetration of water, any dissolved oxygen it carries, and or any aggressive ions such as $Cl^-$ or $H^+$. This labyrinthine path significantly reduces the diffusion rate of water and substances dissolved in the water across the tiecoat layer. This is evidenced by the results of a test of water vapour transmission rate for a coating comprising two types of commercially available graphene/graphitic platelets (A-GNP35 which has 6-14 layers of carbon atoms and A-GNP10 which has 25 to 35 layers of carbon atoms, both available from Applied Graphene Materials UK Limited, United Kingdom) and a control (i.e. no graphene present). The results are shown in FIG. 1.

Graphene/graphitic platelets typically have a thickness of between 0.3 nm and 12 nm and lateral dimensions ranging from around 100 nm to 100 μm. As a result, and because of the graphene/graphitic platelet's high lateral aspect and surface area, a coating comprised of a tiecoat composition according to the present invention may be significantly thinner than comparable coatings comprising other barrier mechanism substances/pigments such as micaceous iron oxide, glass flake, and/or aluminium flake. Further, it has been found that use of graphene platelets results in a coating with good adhesion and mechanical properties. In some embodiments of the present invention, the graphene/graphitic platelets and or nanoplates of 2D materials have a D50 particle size of less than 45 μm, less than 30 μm, or less than 15 μm as measured by a Mastersizer 3000.

In some embodiments of the present invention the primer corrosion inhibitor is one of or a mixture of zinc, inorganic salts of magnesium and or inorganic salts of manganese.

Anti-corrosion coating systems may comprise a composition according to the present invention. Such coatings fall within the scope of the present invention. Such coatings may further comprise other constituents known to be of use in the formulation and/or manufacture of anti-corrosion coatings.

In some embodiments of the present invention the tiecoat composition further comprises a further tiecoat corrosion inhibitor, in which the further tiecoat corrosion inhibitor has a galvanic cathodic mechanism or a passivation mechanism. In some embodiments of the present invention the further tiecoat corrosion inhibitor is present in the range of 0.05 wt % to 1.0 wt %, 0.05 wt % to 0.8 wt %, 0.05 wt % to 0.6 wt %, or 0.1 wt % to 0.5 wt % of the tiecoat composition. In some embodiments of the present invention the further tiecoat corrosion inhibitor is present at a rate of 0.1 wt % or 0.5 wt % of the second composition (i.e. tiecoat composition).

In some embodiments of the present invention the further tiecoat corrosion inhibitor comprises at least one of an ion exchanged pigment, a silica, a calcium exchanged silica, an oxyaminophosphate salt of magnesium, and/or a mixture of an organic amine, a phosphoric acid and/or an inorganic phosphate and a metal oxide and/or a metal hydroxide.

Ion exchanged pigments, silicas, calcium exchanged silicas, and oxyaminophosphate salts of magnesium are all generally regarded as being non-hazardous substances. Mixtures of an organic amine, a phosphoric acid and/or an inorganic phosphate and a metal oxide and/or a metal hydroxide are generally regarded as being non-hazardous substances dependent on the metal used. Such substances are thus beneficial in that they offer much less environmental concern than previously used corrosion inhibitors.

In some embodiments of the present invention the further tiecoat corrosion inhibitor, i.e. a third tiecoat corrosion inhibitor comprises one or more of zinc chromate, zinc molybdate, zinc tungstate, zinc vanadate, zinc phosphite, zinc polyphosphate, zinc borate, zinc metaborate, magnesium chromate, magnesium molybdate, magnesium tungstate, magnesium vanadate, magnesium phosphate, magnesium phosphite, magnesium polyphosphate, magnesium borate, magnesium metaborate, calcium chromate, calcium molybdate, calcium tungstate, calcium vanadate, calcium phosphate, calcium phosphite, calcium polyphosphate, calcium borate, calcium metaborate, strontium chromate, strontium molybdate, strontium tungstate, strontium vanadate, strontium phosphate, strontium phosphite, strontium polyphosphate, borate, strontium metaborate, barium chromate, barium molybdate, barium tungstate, barium vanadate, barium phosphate, barium phosphite, barium polyphosphate, barium borate, barium metaborate, aluminium chromate, aluminium molybdate, aluminium tungstate, aluminium vanadate, aluminium phosphate, aluminium phosphite, aluminium polyphosphate, aluminium borate, and/or aluminium metaborate.

In some embodiments of the present invention, the carrier medium of the primer and or tiecoat composition is an epoxy resin. Accordingly, in such embodiments the tiecoat carrier medium comprises a curable resin, which may be a liquid curable resin. Accordingly, in such embodiments the primer carrier medium comprises a curable resin, which may be a liquid curable resin.

As a result, a coating formed from a primer and or tiecoat composition according to some embodiments of the present invention will be comprised of an epoxy resin in which are encased the first and or second corrosion inhibitors (i.e. the primer corrosion inhibitor and/or the tiecoat corrosion inhibitor). Accordingly, in such embodiments the primer corrosion inhibitor is encased in the primer carrier medium of the primer coating layer formed from the primer composition. In such embodiments, the primer corrosion inhibitor is substantially homogeneously dispersed through the primer coating layer.

Accordingly, in such embodiments the tiecoat corrosion inhibitor is encased in the tiecoat carrier medium of the tiecoat coating layer formed from the tiecoat composition. In such embodiments, the tiecoat corrosion inhibitor is substantially homogeneously dispersed through the tiecoat coating layer.

In embodiments, in which the tiecoat composition comprises a further tiecoat corrosion inhibitor, the further tiecoat corrosion inhibitor is encased in the tiecoat carrier medium of the tiecoat coating layer formed from the tiecoat composition. In such embodiments, the further tiecoat corrosion inhibitor is substantially homogeneously dispersed through the tiecoat coating layer.

In some embodiments of the present invention the carrier medium of the primer and or tiecoat composition is comprised of one or more suitable crosslinkable resins, non-crosslinkable resins, thermosetting acrylics, aminoplasts, urethanes, carbamates, polyesters, alkyds epoxies, silicones, polyureas, silicates, polydimethyl siloxanes, vinyl esters, unsaturated polyesters and mixtures and or combinations thereof.

Epoxy resins and other materials that are suitable for use as the carrier medium of the primer composition will, after a relatively short period of exposure to water or humidity, become saturated with water and or dissolved oxygen and or dissolved ions such as $Cl^-$ from sodium chloride or $H^+$ ions from water. The water, oxygen and or dissolved ions can, if they reach the interface between the primer coating and the metallic substrate lead to the creation of electrochemical cells and wet corrosion of the metallic substrate may ensue. The mechanism of such corrosion is well known and does not need to be discussed herein.

The use of a tiecoat layer according to the present invention has the benefit that the barrier to the transmission of water, oxygen and or dissolved ions, resultant from the tiecoat corrosion inhibitor, inhibits or delays that water, oxygen and or dissolved ions from reaching the surface of the primer layer remote from the metallic substrate and thus inhibits or delays the saturation of the primer layer with the water, oxygen and or dissolved ions.

Graphene has many forms and growth of a film by CVD (Chemical Vapor Deposition) is well understood and can give rise to graphene films of 1-3 atomic layers. Such films are used frequently in experimentation in connection with graphene. Such techniques have limited commercial applicability because they enable only relatively small areas of film to be created or substrate to be coated. In commercial applications it is more typical for graphene to be used in the form of graphene nanoplatelets. Graphene nanoplatelets may be produced by either exfoliation of graphite or via synthetic solvothermal processes. Such graphene nanoplatelets may vary substantially in number of atomic layers, surface area, functionality and $sp^2$ content. Such variations impact on the physical properties of the graphene such as the conductivity of the graphene. Likewise, graphite flakes with nanoscale dimensions and 40 or less layers of carbon atoms, graphite flakes with nanoscale dimensions and 25 to 30 layers of carbon atoms, graphite flakes with nanoscale dimensions and 20 to 35 layers of carbon atoms, or graphite flakes with nanoscale dimensions and 20 to 40 layers of carbon atoms may be produced by either exfoliation of graphite or via synthetic solvothermal processes.

Graphene/graphitic platelets typically have a thickness of between 0.3 nm and 12 nm and lateral dimensions ranging from around 100 nm to 100 μm. As a result, and because of the graphene/graphitic platelet's high lateral aspect and surface area, a coating comprised of a composition according to the present invention may be significantly thinner than comparable coatings comprising other barrier mechanism substances/pigments such as micaceous iron oxide, glass flake, and/or aluminium flake. Further, it has been found that use of graphene platelets results in a coating with good adhesion and mechanical properties. In some embodiments of the present invention, the graphene platelets have a D50 particle size of less than 45 μm, less than 30 μm, or less than 15 μm as measured by a Mastersizer 3000.

It is well known that metals, particularly steel, can be protected against the rapid deteriorative effects of corrosion by applying a coating of metallic zinc to the steel. The coating may be by dipping the steel in molten zinc (galvanising), this is not, however, always possible. A second, often more practical approach is to coat the steel with a zinc rich coating.

Galvanising protects the steel because zinc is much more durable under most conditions than is steel. Thus, the zinc coating forms a barrier on the surface of the steel which corrodes only very slowly while shielding the steel from corrodents.

The protection against corrosion given to the steel by a zinc rich coating is provided in several ways.

The use of a zinc rich coating protects the steel by electrochemical or sacrificial action of the zinc. This effect occurs when the steel and the zinc particles of the coating are electrically coupled and in contact with a conductive aqueous solution. In such a case, the steel is protected at the expense of the zinc because the electrical potential of the zinc is sufficiently higher than that of the steel (iron) that the flow of electrons is directed to the steel, maintaining a negative charge on the steel surface and preventing the formation of the ferrous ions which can lead to iron (III) oxide (rust). This effect results in the formation of zinc hydroxide on the zinc which in turn reacts with chlorine or carbon dioxide in the surrounding environment to form basic zinc salts. These basic zinc salts deposit on the steel surface. The zinc salts form a protective coating which affords good barrier protection to the steel. When this effect is taking place, the metallic zinc in the zinc rich coating is being consumed by the salt formation.

It is known that cathodic protection only occurs until such time that electrical contact between zinc particles and steel is lost following dissolution of zinc and formation of zinc hydroxide and hydrozincite. The efficiency of zinc rich primers is accordingly low and is accompanied by leaching of zinc compounds creating an environmental issue.

It is known to incorporate conductive carbon black in zinc rich coatings to improve the electrical connectivity of the zinc particles and the steel thus enabling lower zinc metal loadings and improved film performance. Several alternatives to conductive carbon black have been evaluated (carbon nanotubes, graphene) with varying levels of success.

Without being bound by theory, it is thought that the barrier activity of the graphene/graphitic platelets and or nanoplates of 2D materials once encapsulated in the carrier medium of the second composition (i.e. tiecoat composition) such as an epoxy resin, and applied as the second coating layer (i.e. tiecoat coating layer) to a first coating layer (i.e. primer coating layer) comprising a zinc rich primer, and below the third coating layer (i.e. finish coating layer) acts a highly efficient barrier reducing the rate of water uptake by the first coating layer (i.e. primer coating layer) and as a result the rate of reaction of the zinc rich primer.

It is in this way there are a number of benefits which are accrued by use of the composition of the first aspect of the present invention as the tiecoat coating layer (i.e. second coating layer) in a three coating layer coating system. They are:

a. an increased lifetime of the coating system as a whole
b. a potential to reduce the thickness of the zinc rich primer
c. a reduction in the amount of Zinc lost by leaching from the film resulting in improved environmental performance.

In compositions (i.e. tiecoat compositions) according to the present invention, the inclusion of at least one third corrosion inhibitor (i.e. a further tiecoat corrosion inhibitor) having a passivation mechanism helps prevent corrosion or contain initiated corrosion.

In some embodiments of the present invention the further tiecoat corrosion inhibitor comprises at least one ion exchange pigment (IEP). Ion exchange pigments include but are not limited to compositions comprising silica, calcium exchanged silica, and alumina. Ion exchange pigments are a relatively new class of pigments which are corrosion inhibitors with a passivation mechanism. These compounds are inorganic oxides having a large surface area and are loaded with ionic corrosion inhibitors by ion exchange with surface hydroxyl groups. The oxides are chosen for their acidic or basic properties to provide either cation or anion exchanger (silica is used as a cation support, alumina for an anion support). The corrosion protection behaviour of the primer corrosion inhibitors is controlled by the rate of ion release caused by solution of the ion exchange pigment.

Calcium exchanged silica ion exchange pigments offer an environmentally friendly alternative to chromium and zinc-based systems. Calcium exchanged silicas function through controlled diffusion as water and aggressive ions permeate the coating. The ions released by the ion exchange pigment react with the metallic substrate in a known fashion in connection with passivation. There are both anodic and cathodic reactions. Depending on the pH in the coating, silica of the ion exchange pigment can dissolve as silicate ions. When the metallic substrate is an iron alloy such as low or medium or high unalloyed carbon steel or low or high alloy steel. This soluble fraction of the pigment, the silicate ions, can react with ferric ions. This results in the formation of a protective layer on the surface of the metallic substrate. Parallel to this reaction, calcium cations or other metallic cations on the silica surface are released and, by reaction with the soluble silica, form a calcium silicate film in alkaline regions on the metal surface. This together with the iron silicate helps to reinforce the protective layer by formation of a mixed oxide layer on the metal surface. At the same time, calcium or other metallic cations are released and the silica captures aggressive cations entering the calcium silicate film. These processes of film and compound formation result in suppression of the corrosion reaction via a two-fold passivation mechanism: adsorption of aggressive ions and the formation of a protective layer on the metallic substrate.

In some embodiments of the present invention the further tiecoat corrosion inhibitor comprises at least one oxyaminophosphate salt of magnesium. The oxyaminophosphate salts of magnesium constitute alternative environmentally friendly anticorrosive materials. Immediately after exposure of an oxyaminophosphate salt of magnesium to humidity, the amine of that salt passivates the metal surface by known passivation mechanisms. As a result of that passivation, a protective layer, composed mainly of magnesium oxide, is deposited on the surface of the metallic substrate, the layer being approximately 25-50 nm thick. When the metallic substrate is steel, the protective layer keeps the metal surface passive by providing anodic inhibition. When the metallic substrate is aluminium or an aluminium alloy, the magnesium oxide layer keeps the potential above the corrosion potential of the aluminium or aluminium alloy thus providing cathodic inhibition.

Electrochemical Impedance Spectroscopy (EIS) studies have shown that while graphene has in its natural state a high level of conductivity, when incorporated in an epoxy resin (epoxy resins are generally good electrical insulators) as platelets, this conductivity is significantly reduced. This is especially so when the epoxy resin contains other amorphous or crystalline additives such as pigments and fillers creating a homogeneous but highly disordered matrix. In such a matrix, the graphene platelets will not exhibit any significant electrical conductivity and consequently will not impart any cathodic protection or offer any benefit to the corrosion potential at the surface of the metallic substrate.

A benefit of the tiecoat composition according to the present invention is that the tiecoat and further tiecoat corrosion inhibitors act synergistically with each other. In particular, the combination of the tiecoat and further tiecoat corrosion inhibitors within the same carrier medium has the benefit of increasing the service life of the tiecoat layer comprised of a tiecoat composition according to the present invention. That enhancement can be significant and may be in excess of double, triple or quadruple the service life of known anti-corrosive coatings. In this context, service life is to be understood to be the period of time between application of the coating and the need to reapply the coating because of degradation of the coating first applied. In terms of International Standards Organisation standard 4628-3:2005, the service life is the period of time between application of the coating and when a rust assessment of grade Ri3 occurs.

A further benefit of the composition according to the first aspect of the present invention (i.e. the tiecoat composition) and the coating system according to the second aspect of the present invention is that the tiecoat coating layer of the first aspect enhances the adhesion of the primer coating layer to the finish coating layer relative to known systems.

Without wishing to be bound by theory, it is understood that the increase in service life for the coating is achieved for the following reasons:

- The primer corrosion inhibitors are substantially homogeneously mixed in the primer carrier medium with the result that some of the first corrosion inhibitor is proximal to the interface between the primer coating layer and the metallic substrate.
- The tiecoat corrosion inhibitors are substantially homogeneously mixed in the tiecoat carrier medium with which is applied as the tiecoat coating layer.
- The optional further tiecoat corrosion inhibitor is substantially homogeneously mixed in the tiecoat carrier medium carrying the tiecoat corrosion inhibitor with which is applied as the tiecoat coating layer.
- The metal proximal primer corrosion inhibitor can dissociate from humidity experienced during the application of the primer coating layer and ultimate exposure during use to form zinc hydroxide and hydrozincite when the primer corrosion inhibitor is zinc;
- The graphene/graphitic platelets and or nanoplates of 2D materials distributed through the tiecoat carrier medium creates labyrinthine paths between the face of the tiecoat coating layer remote from the metallic substrate and the face of the tiecoat coating layer adjacent the primer coating layer;
- The labyrinthine paths created by the graphene/graphitic platelets and or nanoplates of 2D materials inhibit the diffusion of water, dissolved oxygen, and/or dissolved ions from the face of the tiecoat coating layer remote from the metallic substrate to the face of the tiecoat coating layer adjacent the primer coating layer;
- Once the water, dissolved oxygen, and dissolved ions have diffused through the labyrinthine paths in the tiecoat coating layer they enter the primer coating layer, encounter the primer corrosion inhibitor and cause that primer corrosion inhibitor (i.e. first corrosion inhibitor) to dissolve and react;
- The slow diffusion of water, dissolved oxygen, and/or dissolved ions along the labyrinthine paths of the tiecoat coating layer (i.e. second coating layer) has the effect that it takes a considerable time for the primer corrosion inhibitor (i.e. first corrosion inhibitor) in the primer coating layer to be fully dissolved with the result that there is a very considerable period before the primer corrosion inhibitor in the primer coating layer is exhausted and the benefit of the primer corrosion inhibitor is finished. That period is greater than for known anti-corrosive coatings and as such the primer coating layer has an increased service life.

The increased service life of coatings comprising tiecoat compositions according to the present invention will have a significant economic benefit because the application of corrosive coatings is expensive both in terms of labour and materials costs, and a significant ecological benefit because less coatings are being used and, as described above, the content of the coatings may be ecologically better than known coatings.

EXPERIMENTAL

A graphene free epoxy prototype base coating (part A) was initially prepared, formulated to be representative of a standard commercial intermediate coating layer, as outlined in Table 1.

TABLE 1

| | Number | Component | Wt. % | Control | D1: Reduced Graphene Oxide Dispersion | D2: Graphene Dispersion | D3: Hybrid Dispersion |
|---|---|---|---|---|---|---|---|
| Part A | 1 | Epoxy (EEW 190 g/eq) | 15.119 | 15.119 | 15.119 | 15.119 | 15.119 |
| | 2 | Amino Resin | 0.244 | 0.244 | 0.244 | 0.244 | 0.244 |
| | 3 | Dispersant | 0.402 | 0.402 | 0.402 | 0.402 | 0.402 |
| | 4 | Xylene | 15.376 | 15.376 | 15.376 | 15.376 | 15.376 |
| | 5 | Bentonite thixotrope | 0.366 | 0.366 | 0.366 | 0.366 | 0.366 |
| | 6 | Butanol | 1.986 | 1.986 | 1.986 | 1.986 | 1.986 |
| | 7 | Titanium dioxide | 10.966 | 10.966 | 10.966 | 10.966 | 10.966 |
| | 8 | Blanc Fixe | 43.619 | 43.619 | 43.619 | 43.619 | 43.619 |
| | 9 | Epoxy (EEW 190 g/eq) | 0 or 10 | 10 | 0 | 0 | 0 |
| | 10 | GNP dispersion | 0 or 10 | 0 | 10 | 10 | 10 |
| Part B | 11 | Amine slow cure hardener | 1.922 | 1.922 | 1.922 | 1.922 | 1.922 |
| | | Total | | 100 | 100 | 100 | 100 |
| | | GNP loading | | 0 | 1 | 0.1 | 0.5 |

able GNP-containing dispersion additives (formulation component 9) for epoxy in the final step (formation component 10).

The graphene dispersion additives, as detailed in Table 2, were effectively treated as masterbatches, and were added in varying amounts according to their graphene content and the final graphene content specified in the end coating (Table 1, i.e. GNP loading).

TABLE 2

| Dispersion Additive | Carrier Medium | GNP type | GNP loading (wt. %) | Additional Component |
|---|---|---|---|---|
| D1 Genable (Trade mark) 1000 | Epoxy (EEW 190 g/eq) | GNP 1 (A-GNP10) | 10 | N/A |
| D2 Genable (Trade mark) 1200 | Epoxy (EEW 190 g/eq) | GNP 2 (A-GNP35) | 1 | N/A |
| D3 Genable (Trade mark) 3000 | Epoxy (EEW 190 g/eq) | GNP 1 (A-GNP10) | 5 | Active anticorrosive inhibitor (10 wt. % Inhibicil) |

D3 comprises a further tiecoat corrosion inhibitor. In the above example, the further tiecoat corrosion inhibitor is a calcium oxide-modified silica product (Inhibisil; see table 2 for further details). In other examples, the further tiecoat corrosion inhibitor may be an ion exchanged pigment or other passivating pigment. In the above example, the further tiecoat corrosion inhibitor, i.e. Inhibisil, is present at a rate of 1 wt % of the tiecoat composition.

The formulation steps were as follows:

Constituents 1 to 6 were charged into a high speed overhead mixer and mixed at 2000 rpm for 10 minutes. The resultant gel was checked to see if it was homogenous and free of bits. If not, mixing was continued until the gel was homogenous and free of bits.

Constituents 7 and 8 were added to the mixer and mixed at 2000 rpm for 15 minutes or until the grind (maximum particle size) was less than 25 μm. This is known as the grind stage of the manufacture.

Constituent 9 was added and mixed at 1000 rpm for 15 minutes. This is known as the let down stage of the manufacture.

An amine slow cure hardener 11 was added at 10 wt % and the composition was then ready for application to a primer coating layer (i.e. a first coating layer) to form a tiecoat coating layer (i.e. a second coating layer) with barrier properties.

As indicated in Table 1 above, three compositions D1, D2, and D3 according to the present invention were then prepared using the same initial preparation route as for the epoxy prototype base, by substituting commercially avail- The graphene dispersion additives (e.g. the graphene/graphitic platelets) used were commercially available from Applied Graphene UK limited, United Kingdom as A-GNP10 or Genable (Trade mark) 1000 which has 25 to 35 layers of carbon atoms, A-GNP35 or Genable (Trade mark) 1200 which has 6 to 14 layers of carbon atoms, and Genable (Trade mark) 3000 which is a mixture of A-GNP10 and Inhibisil (trade mark). Inhibisil is a calcium oxide-modified silica product commercially available from PPG Industries Ohio, Inc., USA.

Prior to coating application, all substrates were degreased using acetone. Each first coat was applied to grit blasted mild steel CR4 grade panels (commercially available from Impress North East Ltd) of dimensions 150×100×2 mm, by means of a conventional spray gun. For multi coat samples the over coating interval was 3 hours with all panels permitted a final curing period of 7 days at 23° C. (+/−2° C.).

Dry film thickness of the prepared coatings were in the range of 50-60 microns for single coat samples and 120-180 microns for multi coat samples. Full details of the coating systems prepared can be seen in Table 3.

TABLE 3

| Coating System | | System Composition Coat 1 | Coat 2 | Coat 3 |
|---|---|---|---|---|
| Single Coat Systems | Commercial equivalent (prototype) (Control) | Commercial equivalent (prototype) | N/A | N/A |
| | D1 | D1 | N/A | N/A |
| | D2 | D2 | N/A | N/A |
| | D3 | D3 | N/A | N/A |
| 3 Coat Systems | Control | Zinc rich primer | Commercial equivalent (prototype) | Polyurethane topcoat |
| | ZRP/D1/PUTC | Zinc rich primer | D1 | Polyurethane topcoat |
| | ZRP/D2/PUTC | Zinc rich primer | D2 | Polyurethane topcoat |
| | ZRP/D3/PUTC | Zinc rich primer | D3 | Polyurethane topcoat |

All substrates were backed and edged prior to testing. The zinc rich primer and the polyurethane topcoat used were standard commercially available primers and topcoats respectively.

Neutral Salt Spray (NSS) Testing

There are three test methods identified in ISO 12944 to demonstrate performance in C4 and C5 atmospheric conditions (see Table 4 which is an extract from ISO 12944).

TABLE 4

| Corrosivity category as defined in ISO 12944-2 | Durability ranges according to ISO 12944-1 | Test regime 1 ISO 2812-2 (water immersion) (h) | ISO 6270-1 (water condensation (h) | ISO 9227 (neutral salt spray) (h) | Test regime 2 Annex B (cyclic ageing test) (h) |
|---|---|---|---|---|---|
| C2 | Low | — | 48 | — | — |
| | Medium | — | 48 | — | — |
| | high | — | 120 | — | — |
| | Very high | — | 240 | 480 | — |
| C3 | Low | — | 48 | 120 | — |
| | Medium | — | 120 | 240 | — |
| | High | — | 240 | 480 | — |
| | Very high | — | 480 | 720 | — |
| C4 | Low | — | 120 | 240 | — |
| | Medium | — | 240 | 480 | — |
| | High | — | 480 | 720 | — |
| | Very high | — | 720 | 1440 | 1680 |
| C5 | Low | — | 240 | 480 | — |
| | Medium | — | 480 | 720 | — |
| | High | — | 720 | 1440 | 1680 |
| | Very high | — | — | — | 2688 |

These include Water Condensation, Neutral Salt Spray and a Cyclic Ageing test. As a preliminary piece of work to identify systems with the potential to deliver extended performance lifetime, Neutral Salt Spray was selected as the initial screening method. Water condensation and cyclic ageing tests will be carried out on graphene formulations that have demonstrated performance equivalent or better than a zinc rich epoxy primer.

The panels were placed in a corrosion chamber, running ISO 9227 for a period of up to 720 hours. This test method consists of a continuous salt spray mist at a temperature of 35° C. Panels were assessed at 10 day (240 hour intervals) for signs of blistering, corrosion, and corrosion creep in accordance with IS04628. These assessments were complimented with electrochemical measurements, carried out at the same intervals.

Electrochemical Measurements

Prior to electrochemical/NSS testing, a small amount of the panel backing material was removed with a knife blade to provide an electrical connection point for the working electrode connectors. Upon completion of electrochemical testing, the removed section of backing material was covered with electrical insulation tape to reduce any possibility of corrosion whilst the sample was under NSS conditions. An additional prior step was to mark out the test area with a permanent marker to aid in relocating the test area for subsequent electrochemical measurements.

All electrochemical measurements were recorded using a Gamry 1000E potentiostat in conjunction with a Gamry ECM8 multiplexer to permit the concurrent testing of up to 8 samples per run. Each individual channel was connected to a Gamry PCT-1 paint test cell, specifically designed for the electrochemical testing of coated metal substrates.

Within each paint test cell, a conventional three-electrode system, the coated steel samples represented the working electrodes, a graphite rod served as a counter electrode and a saturated calomel electrode (SCE) served as the reference electrode. The test area of the working electrode was 14.6 $cm^2$. All tests were run using a 3.5 wt % NaCl electrolyte. For all samples, electrochemical testing consisted of cycle of experiments comprising of corrosion potential measurements ($E_{corr}$), electrochemical AC impedance spectroscopy (EIS) measurements.

AC EIS and $E_{corr}$ measurements allow the quantitative determination of several properties related to corrosion resistance of a sample without the prolonged testing required of artificial weathering.

$E_{corr}$—Electrochemical corrosion potential (ECP) is the voltage difference between a metal immersed in a given environment and an appropriate standard reference electrode (SRE), or an electrode which has a stable and well-known electrode potential. Electrochemical corrosion potential is also known as rest potential, open circuit potential or freely corroding potential, and in equations it is represented by $E_{corr}$. Higher values of $E_{corr}$ indicate lower corrosion rates, and lower values higher corrosion rates.

During all EIS experiments, an AC voltage of 10 mV was applied across the sample, with a zero volt DC bias, over a frequency range of 1 MHz to 0.05 Hz. Ten measurements were recorded for every decade in frequency. An integration time of 1 second per measurement was used with a delay time of 0.2 seconds between each measurement. Equivalent circuit fitting to the obtained data was performed using the proprietary Gamry Echem Analyst software package.

In the first instance, the samples, as described in Table 3 above, were tested before being placed under NSS. The samples were then retrieved from NSS every 10 days, where electrochemical measurements were conducted.

Results & Discussion

Single Layer Coats

Water uptake in organic coatings can be studied and quantified using a variety of different methods such as the more traditional gravimetric methods and capacitance methods. Capacitance methods rely on the creation of a capacitor over time due to water uptake in the organic coating. Water has a dielectric constant around 30 times that of most organic coatings, and the change of capacitance as water enters the coated substrate is related to the level of water uptake. Such dielectric type capacitance information can also be derived from EIS data, although there are several additional advantages of using EIS.

When applied to the study of organic-based protective anticorrosive coatings, impedance values, in their straight form, provide an indication of corrosion protection. Such values may be used as an initial screening for coating barrier type performance. In addition, through the appropriate equivalent circuits modelling of EIS data, additional critical information can be obtained such as pore resistance and coating capacitance along with interfacial properties, where a coating is breached, such as double layer capacitance.

The main contribution of the coating towards impedance occurs within the lower frequency region, at a frequency close to 0.1 Hz. This feature may be used as a type of screening method in the selection of suitable organic coatings. In a review paper concerning the performance of fast-cure epoxies for pipe and tank linings, O'Donoghue et al (Journal of Protective Coatings and Linings (1998), p. 36-51) describe the use of EIS as such a screening tool [ref], where the coating impedance measured at a frequency of 0.1 Hz can be used for screening materials. O'Donoghue et al assign impedance values of $10^4$ Ohm·cm$^2$ to poor coatings and impedance values of $10^{10}$ ohm·cm$^2$ to excellent coatings. In between these values, a relatively good coating is assigned an impedance value in the order of $10^8$ Ohm·cm$^2$, with barrier protection beginning at $10^6$ Ohm·cm$^2$. The barrier performance impedance figures are indicated in FIG. 5 of the O'Donoghue et al paper. Since the O'Donoghue paper, several others have also employed this screening method to measure coating performance.

Figure 2:
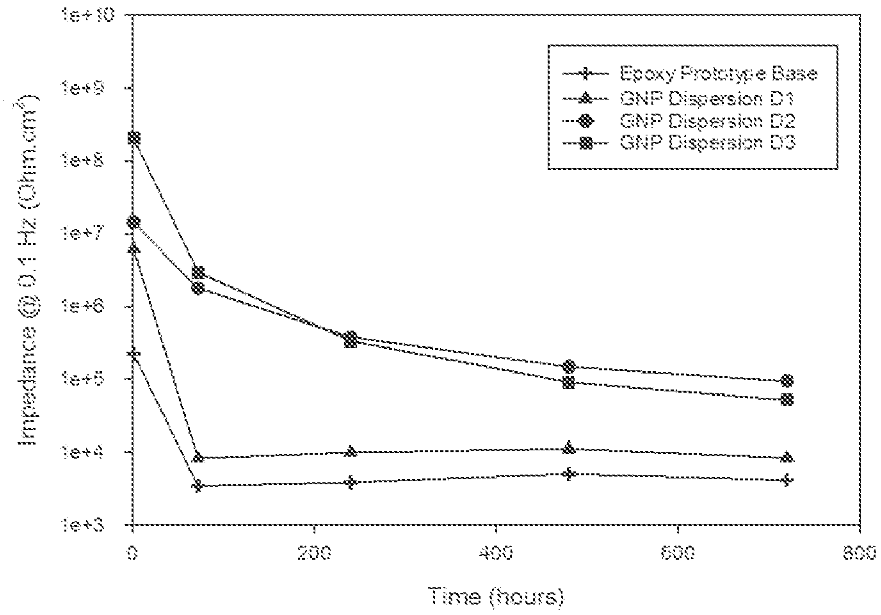
FIG. 2 illustrates the progression of impedance modulus for single coat samples.

FIG. 2 shows the progression of impedance modulus for single coat samples, measured at 0.1 Hz, over the time during which all samples had been placed under NSS test conditions. Since these are single coat samples, and are therefore of really low thickness (50-60 micron range) compared to thicker multi-layered systems, it is observed that impedance values in general are relatively low; performance is judged on relative values not overall impedance values. The commercial equivalent coating shows relatively low impedance values indicating poor barrier properties. When any of the commercial graphene containing dispersions are added to the commercial equivalent coating formulation (prototype), impedance values are increased by varying amounts, showing that in all cases, the inclusion of graphene nanoplatelets is acting to increase the barrier performance properties of the base coating (prototype).

An NSS assessment of the single coats at 720 hours is shown in Table 5.

TABLE 5

| Primer | Creep (mm) | Blistering | Adhesion |
|---|---|---|---|
| Zinc Rich Primer (Commercial) | <1 | None | Good |
| Epoxy Prototype (No graphene) | 3 | — | Good |
| D1: Graphene Oxide Dispersion | 1 | — | Good |
| D2: Graphene Dispersion | 1 | 1s1 | Good |
| D3: Hybrid Dispersion | 1 | 1s1 | Good |

Three Coat Systems

Figure 3:
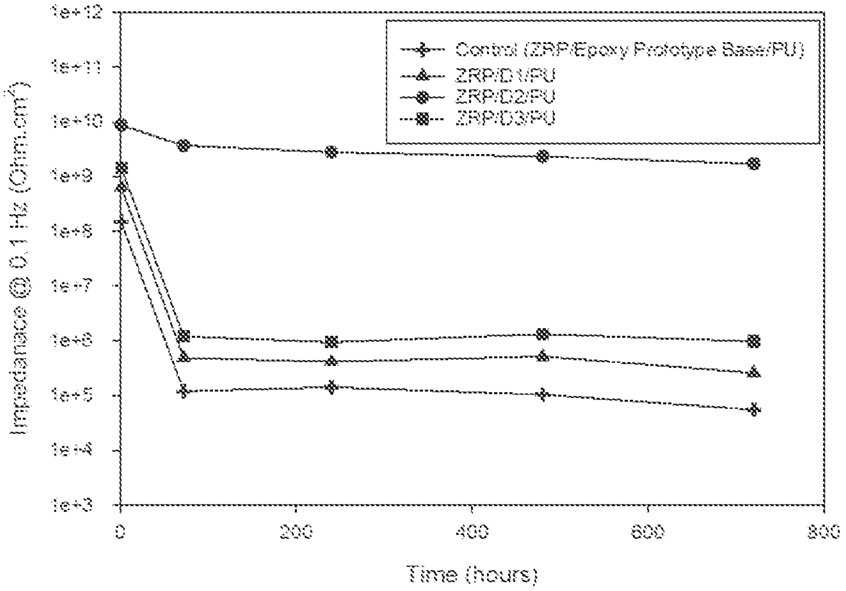
FIG. 3 illustrates the progression of impedance modulus for three coat system samples.

FIG. 3 shows the progression of impedance modulus for the three coat system samples, measured at 0.1 Hz, over the time period during which the samples were subjected to NSS conditions. Initial impedance values (recorded at t=0) range from the orders of $10^8$ to $10^{10}$ Ω·cm$^2$. Overall, these values are higher than the initial values observed in the single layer samples. This is as expected, due to the increased thickness of the three coat systems. The control sample, consisting of a zinc rich primer coat, a layer of commercial equivalent and polyurethane topcoat, displays the lowest overall impedance values in addition to one of the higher rates of decrease of impedance from the t=0 point. When tested as a single entity, the commercial equivalent coat also gave the lowest impedance throughout the duration of the test; also observed when incorporated into a full coating system. When graphene nanoparticles are introduced to the intermediate layer, the impedance modulus is increased by varying amounts over the course of the experiment, suggesting that, once again, the inclusion of graphene nanoparticles is acting to increase the barrier performance properties of the system as a whole. The smallest increase in overall impedance is observed when D1 dispersion is incorporated into the intermediate layer, and this is also the case when D1 is tested as a single coat entity. In the case of the D1 intermediate layer, the impedance is approximately one order of magnitude greater than the control when tested as part of the three coat system, similar to the observations of D1 as a single coat entity. In the single coat testing, dispersions D2 and D3 gave approximately the same level of impedance uplift over the control sample. When these dispersions are incorporated into the intermediate layer of three coat systems, the D3 intermediate layer gave a final uplift of close to 2 orders of magnitude above the control and the D2 intermediate layer gave a final uplift of 5 orders of magnitude above the control. In addition, the D2 incorporated sample (ZRP/D2/PUTC) showed little change in impedance, compared to the other samples, during the course of the experiment. This suggests that the D2 intermediate layer sample offers good to excellent barrier performance throughout the entire experiment, where the control ends just above the poor region.

Coatings of relatively high thickness with superior barrier properties, such as those designed for use in C4/C5 type environments, will typically be of high impedance, both at the onset of exposure and, ideally, beyond as the coating is exposed to harsh environments for extended periods. Coatings of lower performance, either due to a thinner application or inferior barrier properties, may also display a high impedance, if only for a relatively short period of time.

The EIS response of such high impedance coatings, at the very beginning of exposure to harsh C4/C5 type environments is dominated by a capacitive behaviour; the coating is essentially acting a dielectric type capacitor, of either ideal or non-ideal type. Indeed, due to their very nature, complex multi-layered coatings are very likely to display a non-ideal type capacitance. When looking at the phase angle plot from the EIS data, values approaching −90 degrees (or close to if non-ideal) indicate the presence of a pure capacitive type behaviour. Following exposure to harsh environments, water may enter the coating. Depending on the intrinsic properties of the coating, the dielectric constant of water is in the region of 20 times that of the coating, leading to an increase in capacitance as water enters the coating. This change in capacitance is therefore related to water uptake in the coating.

Additionally, further deviation from a purely capacitive behaviour may arise as water or corrosive species penetrates within the coating pores, developing ionic pathways, creating a resistive contribution (pore resistance) to the overall impedance of the system. FIG. 4(*a*) shows a selection of phase shift bode plots for the three coat control sample, from before NSS exposure to 720 hours post NSS exposure. Whilst the T=0 measurement shows a value close to −90 degrees in the higher frequency range, there is some drift away from this value in the lower frequency range, suggesting some water uptake even at this early stage. Subsequent measurements in time show phase shift values relatively far removed from the ideal capacitor value, from 72 hours. The measurements from 72 hours and onwards sit fairly close together, suggesting the coating is nearing its saturation point. In contrast, as shown in FIG. 4(*b*) the phase angle bode plot for the higher impedance sample, ZRP/D2/PUTC, shows relatively little deviation from close to the −90 degrees point, consistent with a coating which has taken up relativity little water. As previously discussed, the fact that the phase angle doesn't sit exactly on −90 degrees is due to the non-ideal capacitive behaviour of the system. Some increasing deviation is observed in the lower frequency domain, indicating that water is starting to enter the system, although the system is by no means fully saturated.

Water uptake as a volume percent, % v, within a coating may be calculated as:

$$\% \; v = 100\frac{\log\left(\left(\frac{1}{C_0}\right)/\left(\frac{1}{C_x}\right)\right)}{\log(80)}$$

Where $C_0$ is the non-ideal coating capacitance at T=0 and $C_x$ is the non-ideal coating capacitance at T=72, 240, 480 and 720 hours. Table 6 shows the water uptake values for the three coat systems.

TABLE 6

| | Water uptake (% v) | | | |
|---|---|---|---|---|
| Sample | 72 hours | 240 hours | 480 hours | 720 hours |
| Control (ZRP/Epoxy Prototype Base/PU) | 61.75 | 63.00 | 62.97 | 66.41 |
| ZRP/D1/PU | 10.16 | 11.28 | 10.21 | 11.61 |
| ZRP/D2/PU | 4.54 | 4.23 | 4.03 | 4.93 |
| ZRP/D3/PU | 5.23 | 5.02 | 4.98 | 5.42 |

An NSS assessment of the multiple coats at 720 hours is shown in Table 7.

TABLE 7

| 1st Coat | 2nd Coat | 3rd Coat | DFT | Creep (mm) | Blistering | Adhesion |
|---|---|---|---|---|---|---|
| Zinc Rich Primer (Commercial) | Zinc Rich Primer (Commercial) | Polyurethane Topcoat | 137 | 0/<1 | None | Good |
| Zinc Rich Primer (Commercial) | Epoxy Prototype (No GNP) | Polyurethane Topcoat | 119 | <1 | None | Slightly lower than ZRP |
| Zinc Rich Primer (Commercial) | D1: Graphene Oxide Dispersion | Polyurethane Topcoat | 129 | <1 | None | Slightly lower than ZRP |
| Zinc Rich Primer (Commercial) | D2: Graphene Dispersion | Polyurethane Topcoat | 129 | <1 | None | Slightly lower than ZRP |
| Zinc Rich Primer (Commercial) | D3: Hybrid Dispersion | Polyurethane Topcoat | 140 | <1 | None | Slightly lower than ZRP |

The invention claimed is:

1. A coating system for a metallic substrate comprising at least three coating layers in which:

a primer coating layer, formed from a primer composition, overlies the metallic substrate, wherein the primer composition comprises a primer carrier medium and a primer corrosion inhibitor, the primer corrosion inhibitor having a galvanic cathodic mechanism;

a tiecoat coating layer, formed from a tiecoat composition, overlies the primer coating layer, wherein the tiecoat composition comprises:

a tiecoat carrier medium;

a tiecoat corrosion inhibitor, having a barrier mechanism, comprising graphene/graphitic platelets and/or nanoplates of 2D materials which have a D50 particle size of less than 45 μm; and a further tiecoat corrosion inhibitor, having a passivation mechanism, comprising an ion exchanged pigment; and a finish coating layer, formed from a finish composition, overlies the tiecoat coating layer, wherein the finish composition is formulated to give a predetermined surface texture and/or appearance.

2. A coating system according to claim 1, in which the tiecoat corrosion inhibitor comprises one of or a mixture of graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphitic nanoplates of 6 to 14 layers of carbon atoms, graphite flakes with at least one nanoscale dimension and 40 or less layers of carbon atoms, graphite flakes with at least one nanoscale dimension and 25 to 30 layers of carbon atoms, graphite flakes with at least one nanoscale dimension and 20 to 35 layers of carbon atoms, or graphite flakes with at least one nanoscale dimension and 20 to 40 layers of carbon atoms.

3. A coating system according to claim 1, in which the tiecoat corrosion inhibitor comprises nanoplates of one of or a mixture of 2D materials and or layered 2D materials, in which the 2D materials are one of or a mixture of graphene, graphene oxide, reduced graphene oxide, hexagonal boron nitride, molybdenum disulphide, tungsten diselenide, silicene, germanene, Graphyne, borophene, phosphorene, or a 2D in-plane heterostructure of two or more of the aforesaid materials, and the layered 2D materials are one of or a mixture of graphene, graphene oxide, reduced graphene oxide, hexagonal boron nitride, molybdenum disulphide, tungsten diselenide, silicene, germanene, Graphyne, borophene, phosphorene, or a 2D vertical heterostructure of two or more of the aforesaid materials.

4. A coating system according to claim 1, in which the tiecoat corrosion inhibitor is present in the range of 0.05 wt % to 0.6 wt % of the tiecoat composition.

5. A coating system according to claim 1, in which the tiecoat corrosion inhibitor is present in the range of 0.1 wt % to 0.5 wt % of the tiecoat composition.

6. A coating system according to claim 1, in which the further tiecoat corrosion inhibitor is present in the range of 0.05 wt % to 1.0 wt % of the tiecoat composition.

7. A coating system according to claim 1, in which the further tiecoat corrosion inhibitor is present in the range of 0.05 wt % to 0.8 wt % of the tiecoat composition.

8. A coating system according to claim 1, in which the further tiecoat corrosion inhibitor is present in the range of 0.05 wt % to 0.6 wt % of the tiecoat composition.

9. A coating system according to claim 1, in which the further tiecoat corrosion inhibitor is present in the range of 0.1 wt % to 0.5 wt % of the tiecoat composition.

10. A coating system according to claim 1, in which the further tiecoat corrosion inhibitor is present at a rate of 0.1 wt % or 0.5 wt % of the tiecoat composition.

11. A coating system according to claim 1, in which the further tiecoat corrosion inhibitor is present at a rate of 0.1 wt % of the tiecoat composition.

12. A coating system according to claim 1, in which the further tiecoat corrosion inhibitor comprises at least one of a silica, a calcium exchanged silica, an oxyaminophosphate salt of magnesium, and/or a mixture of an organic amine, a phosphoric acid and/or an inorganic phosphate and a metal oxide, a metal hydroxide, zinc chromate, zinc molybdate, zinc tungstate, zinc vanadate, zinc phosphite, zinc polyphosphate, zinc borate, zinc metaborate, magnesium chromate, magnesium molybdate, magnesium tungstate, magnesium vanadate, magnesium phosphate, magnesium phosphite, magnesium polyphosphate, magnesium borate, magnesium metaborate, calcium chromate, calcium molybdate, calcium tungstate, calcium vanadate, calcium phosphate, calcium phosphite, calcium polyphosphate, calcium borate, calcium metaborate, strontium chromate, strontium molybdate, strontium tungstate, strontium vanadate, strontium phosphate, strontium phosphite, strontium polyphosphate, borate, strontium metaborate, barium chromate, barium molybdate, barium tungstate, barium vanadate, barium phosphate, barium phosphite, barium polyphosphate, barium borate, barium metaborate, aluminium chromate, aluminium molybdate, aluminium tungstate, aluminium vanadate, aluminium phosphate, aluminium phosphite, aluminium polyphosphate, aluminium borate, and/or aluminium metaborate.

13. A coating system according to claim 1, in which the further tiecoat corrosion inhibitor is a composition comprising silica.

14. A coating system according to claim 1, in which the tiecoat carrier medium comprises a curable resin.

15. A coating system according to claim 14, in which the curable resin comprises an epoxy resin.

16. A coating system according to claim 1, in which the primer corrosion inhibitor is one of or a mixture of zinc, inorganic salts of magnesium and or inorganic salts of manganese.

17. A coating system according to claim 1, in which the further tiecoat corrosion inhibitor is encased in the tiecoat carrier medium of the tiecoat coating layer formed from the tiecoat composition.

18. A coating system according to claim 1, in which the further tiecoat corrosion inhibitor is substantially homogeneously dispersed through the tiecoat coating layer.

* * * * *